Dec. 21, 1965    A. E. BADGER ET AL    3,224,854
TREATMENT OF GLASS BATCH MATERIALS
Filed May 24, 1961

INVENTORS
Alfred E. Badger, Glen J. Lehr
BY and John A. Woods.
Nobbe & Swope
ATTORNEYS 3,224,854
TREATMENT OF GLASS BATCH MATERIALS
Alfred E. Badger, Maumee, Glen J. Lehr, Oregon, and John A. Woods, Lancaster, Ohio, assignors to Libbey-Owens-Ford Glass Company, Toledo, Ohio, a corporation of Ohio
Filed May 24, 1961, Ser. No. 112,262
1 Claim. (Cl. 65—135)

This application is a continuation-in-part of our co-pending application Serial No. 576,044, filed April 4, 1956, now abandoned.

This invention relates to the treatment of glass batch materials, and more particularly to the treatment of limestone as one such material in connection with the production of glass.

In the past, the limestone used in glass batches has tended to "pop" or "explode" under the melting heat as the batch materials were heated to fuse them into molten glass. This "popping" or "exploding" causes portions of the batch materials to leave the surface of the batch and be carried into the gas and flame streams which are conventionally played over the batch or charge to melt it. As the products of combustion are carried away from the furnace melting chamber, the batch materials which leave the batch upon exploding are carried out of the furnace by the force of the moving gases.

As a result, the amount of batch material in the furnace is reduced resulting, in some cases, in a deficiency in the proportions of some of the batch materials, and also in a reduction of the amount of glass obtained from a given amount of batch material. The chief objection, in the case of regenerative furnaces, is that the carry-over of batch materials to the regenerators causes such units to accumulate the carry-over material and they become clogged and inefficient. This of course requires that the regenerators be cleaned periodically, resulting in substantial losses in production and labor time.

It is therefore a primary object of this invention to provide a method of pre-treating glass batch materials to prevent subsequent popping.

A further object of the invention is to provide a method of treating limestone used in glass batch materials such that it does not pop or explode when used in a glass batch.

Another object of the invention is to provide a method of melting and producing glass more efficienly.

A still further object of the invention is to provide a method of improving the quality of glass obtained from a given glass batch.

Other objects and advantages of the invention will become more apparent during the course of the following description when taken in connection with the accompanying drawings.

In the drawings wherein like numerals are used to designate like parts throughout the same:

Figure 1:
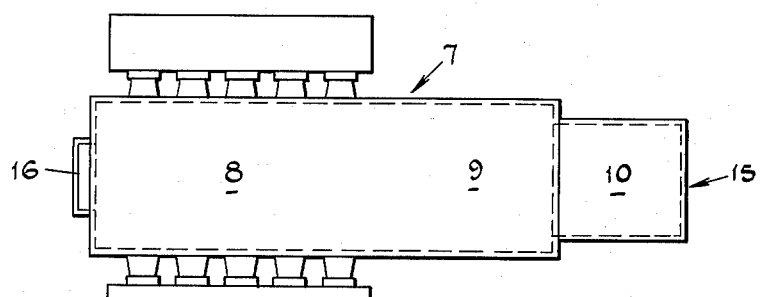
FIG. 1 is a plan view of a representative type of regenerative or recuperative furnace of the character commonly used in making sheet or plate glass and in connection with which the invention may be practiced.

Referring now more particularly to the drawings, there is shown most completely in FIG. 1 a relatively simple form of continuous glass furnace 7 with which the present invention may be practiced. Now all of the glass furnaces of the character with which this invention is primarily concerned are made up of:

(1) a closed melting chamber within which the raw glass making materials or batch, in finely divided form is melted to convert it into liquid molten glass;

(2) a closed refining chamber into which the molten glass from the melting chamber flows and within which the liquid molten glass is conditioned, under heat, to remove bubbles and other producs of the melting step; and, usually, (3) a closed tempering or cooling chamber in which the molten and refined glass is brought to the temperature necessary to permit it to be used in producing the particular type of ultimate glass article desired.

There are a number of specifically different designs of such continuous or semi-continuous glass furnaces, but all of them include substantially this same essential arrangement and succession of melting, refining and temperating containers or chambers outlined above. Thus, in one well known form of continuous glass furnaces intended for the production of plate or window glass, and which has been illustrated in FIG. 1, the melting, refining and tempering chambers, designated 8, 9 and 10 respectively, are merely successive zones of what amounts to a continuous glass melting tank enclosed by a single roof structure. In a somewhat modified form of structure, one or more of the melting, refining and tempering chambers may be divided from the others by suitable necks, throats, bridge walls, curtain walls or the like (not shown).

In still another form of continuous glass tank furnace, one or more of the melting, refining and tempering compartments may be separate or individual closed containers often of varying depths with suitable passageways to permit flowing of liquid molten glass therebetween.

Figures 2, 4:
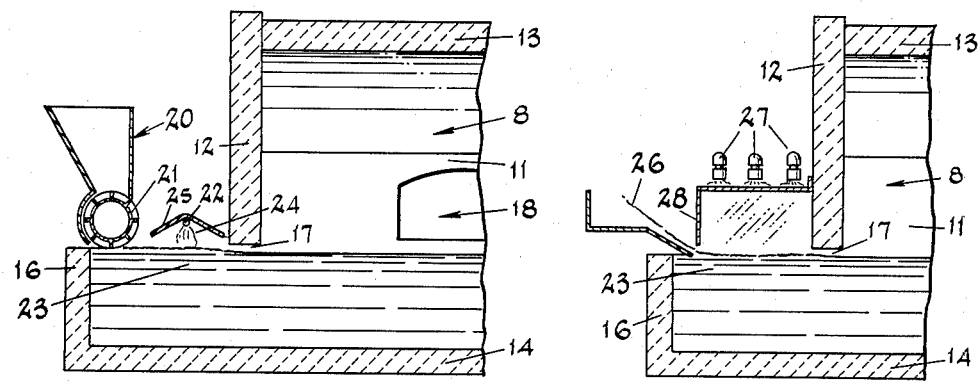
FIG. 2 is a fragmentary vertical sectional view taken substantially along the line 2—2 of FIG. 1 and illustrating an embodiment of the invention.
FIG. 4 is a plan view of the embodiment shown in FIG. 3.

With the structure shown in FIGS. 1 and 2, however, the melting chamber 8 includes side walls 11, end walls 12, a crown 13 and a bottom 14 which cooperate to substantially completely enclose the chamber on three sides. A supply of molten glass is continuously maintained in the melting, refining and cooling chambers of the furnace and, from the opposite or discharging end 15 there is continuously withdrawn an endless ribbon of glass that may subsequently be cut up, either into sheets of window glass or into plate glass blanks for grinding and polishing, dependent on the purpose for which the furnace is being operated.

In order to maintain the supply of molten glass within the furnace at a relatively uniform level, batch material is more or less continuously supplied to an open doghouse 16 from which it moves with the molten glass into the substantially closed melting chamber.

The melting chamber 15 is provided, along its side walls 11, with a series of oppositely located heating ports 18. Each of the ports 18 connects into a regenerative unit 19 which acts to preheat the air and gaseous fuel that is directed, first through the ports on one side and then through the ports on the other, over the batch materials in the melting chamber to melt the same.

In operation a regenerative unit on one side of the furnace will fire for a period while the regenerative unit on the opposite side of the furnace is conducting the products of combustion away from the furnace. The operation of the regenerative units is then reversed for an equal period. As the combustion gases are carried away from the furnace by one regenerative unit or the other, they pass over checkers or heat retaining members in the regenerator to heat such members so that they will operate to preheat the air and/or fuel when the operation of the regenerative unit is reversed.

Now heretofore, in the production of flat glass in this manner, it has been found thatt he limestone used in the glass batch popped or exploded when subjected to the heat of the melting fire and hot gases (conventionally between approximately 2500° and 2800° F.) in the closed melting chamber; and that the exploding effect of the limestone not only caused particles of limestone in the batch to be projected upwardly into the current of the flame and combustion gases above the batch, but also carried particles of other batch constituents with it.

This resulted in an appreciable amount of some of the essential ingredients from the batch being exhausted from the furnace and also, since there is always a rapidly moving stream of gases between the firing port and the exhaust port, these batch constituents were carried into the regenerators where they were deposited, usually in the checker work. Consequently, the quality of the glass produced was affected by the reduction of certain of the constituents in the batch. Also the carry-over of batch materials into the regenerative units resulted in decreased efficiency of the furnace, reduced output and necessitated frequent cleaning shutdowns.

According to the present invention this objectionable popping or exploding of the linestone particles within the closed melting chamber of the furnace can be overcome by preheating the linestone between temperatures of approximately 700° to 1000° F. in the open before introducing it into the furnace. This treatment causes the limestone to pre-explode and may be carried out in any one of a number of areas where the explosion will have no injurious effect. For example, one way of practicing the invention is to heat the linestone to the necessary temperature at the place of quarrying. In this case, the pre-exploded limestone is ready to be mixed in the batch without any further treatment prior to moving the batch into the melting chamber of the furnace in the conventional manner.

An alternate procedure is illustrated in FIG. 2 wherein there is shown a typical charging device 20 which feeds the batch material into the closed melting chamber of the furnace from an open doghouse 16 by rotation of a cylinder 21. Here there is provided a burner 22 which extends substantially the width of the doghouse so as to traverse the path of the batch material 23 as it is moved toward the melting chamber. The burner directs a blanket or line of flame indicated at 24 over the upper strata of the batch blanket causing the limestone contained therein to explode or pop in the open doghouse before entering the closed furnace melting chamber 15.

As the limestone particles explode under the burner 22, the particles which leave the level of the batch material are deflected back into the batch by a metal shield or the like 25 which is positioned above the burner 22. Then, when the batch is moved into the furnace, heat from the firing ports penetrates the upper strata and causes the batch materials to fuse thus causing a glassy, frothy layer to form on the surface of the batch. Since the limestone particles in the upper strata had been previously exploded by the burner 22 outside the melting chamber there will be no further popping or exploding effect. Although the limestone particles in the lower strata may have a tendency to pop, they will not break through the upper glassy layer and thus cannot be carried into the turbulence of the flame and combustible gas stream flowing across the furnace.

Figures 3, 5:
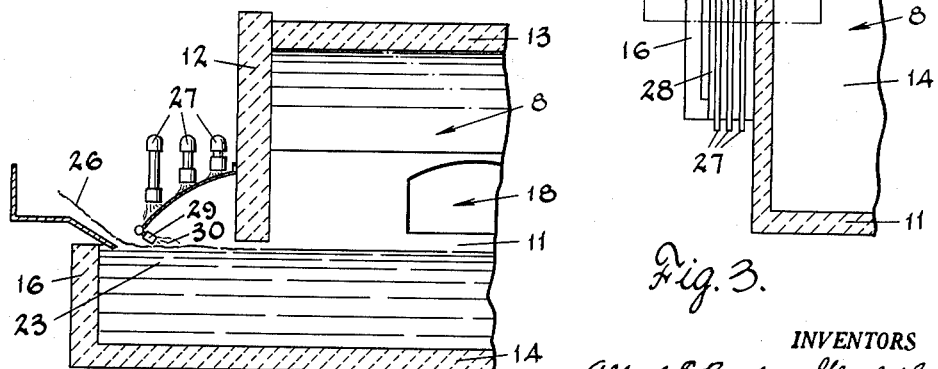
FIG. 3 is a fragmentary sectional elevation of another embodiment of the invention using different heating anu deflecting means.
FIG. 5 is a further embodiment of the invention.

An alternate embodiment of apparatus which may be used to treat the limestone and batch materials as they are moved from the doghouse into the furnace proper is shown in FIGS. 3 and 4. As shown therein, the batch materials are fed into the doghouse by a charging device 26. According to this embodiment, burners 27, which are used to heat the batch before it is moved into the furnace to cause a sintering of the batch, are placed above a deflecting shield 28 so that the exploding limestone and batch material will not cause the burners to become clogged.

As an alternate method of treating the batch blanket, the temperature of the heat directed to the charge in the doghouse may be increased to pre-fuse the upper strata of the batch blanket. By this method a glassy crust is formed on the top of the blanket before it enters the furnace. The pre-fused blanket not only decreases the carry-over of batch materials to the regenerators or out of the furnace because of the exploding or popping phenomenon, but in addition decreases the carry-over of all other fine constituents which heretofore have been carried out of the furnace by the sheer force of the flame and gas currents. Moreover, the formation of a fused crust on top of the blanket enables very fine limestone to be used which is generally a waste material in some quarries and heretofore has not been satisfactorily used for glass melting due to its dustiness, which as noted above, makes it very susceptible to being blown by the combustion gases into the regenerative units.

In FIG. 5 there is shown an embodiment of the invention which may be used to pre-fuse or glaze the batch materials before they are moved into the furnace. The apparatus of FIG. 5 differs from that shown in FIG. 3 by using an additional burner 29 which extends across the entire width of the doghouse and plays a strong intense flame 30 on the surface of the batch material to cause it to become glazed or pre-fused.

While it is not definitely known what causes the limestone to pop or explode, it is believed that it is caused by voids or inclusions in the limestone grains or particles. These voids or inclusions may include air or water which will cause an explosive effect when heated. Generally, it has been found that white limestone has a greater tendency to pop than does the gray limestone and there is some evidence that the inclusions might include a crystalline material in the form of magnesite ($M_gCO_3$). This material decomposes at about 700° F. which is approximately the minimum temperature necessary for popping. Since the $M_gO$ content of white limestone is found to be approximately 0.3% higher than the content found in the gray limestone, it is believed that this might also have a bearing on the differences in popping between the two types of limestone.

It is to be understood that the forms of the invention disclosed herein are to be taken as preferred embodiments thereof, and that various changes in size, shape and arrangement of parts, as well as procedural changes, may be resorted to without departing from the spirit of the invention or the scope of the following claim.

We claim:

In a method of producing molten glass from a glass batch including thermally explosive limestone and in which said batch is subjected to a temperature between 2500° and 2800° F. within an enclosed reaction area to melt the same, the mechanical step of popping limestone in said batch by subjecting the surface thereof to a temperature between approximately 700° and 1000° F. outside of said enclosed area without chemically decomposing said limestone, and then subjecting said batch to said melting temperature to chemically react said exploded limestone with said other glass making materials at said glass melting temperatures within said enclosed reaction area to produce said molten glass.

References Cited by the Examiner

UNITED STATES PATENTS

| | | | |
|---|---|---|---|
| 2,114,545 | 4/1938 | Slayter | 65—335 |
| 2,397,852 | 4/1946 | Gentil | 65—335 X |
| 2,474,207 | 6/1949 | Lovell et al. | 263—53 X |
| 2,634,555 | 4/1953 | Henry et al. | 65—335 X |
| 2,718,096 | 9/1955 | Henry et al. | 65—335 |
| 2,780,891 | 2/1957 | Arbeit | 65—335 |
| 2,975,555 | 3/1961 | Zellers et al. | 65—27 |
| 3,001,881 | 9/1961 | Slayter | 106—52 |

FOREIGN PATENTS

| | | |
|---|---|---|
| 486,447 | 11/1929 | Germany. |
| 597,844 | 2/1948 | Great Britain. |

DONALL H. SYLVESTER, *Primary Examiner.*

IVAN R. LADY, *Examiner.*